R. JACOBI.
LOOSE RIM WHEEL.
No. 185,929. Patented Jan. 2, 1877.
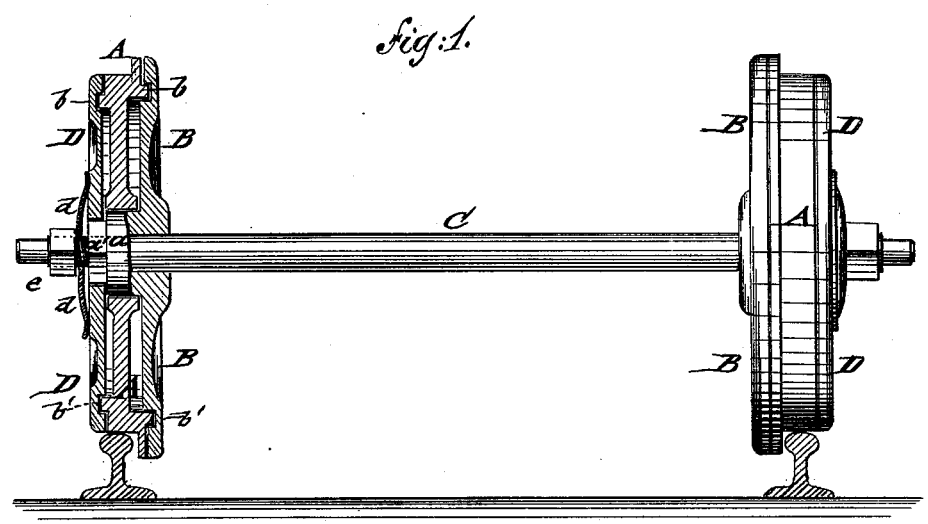
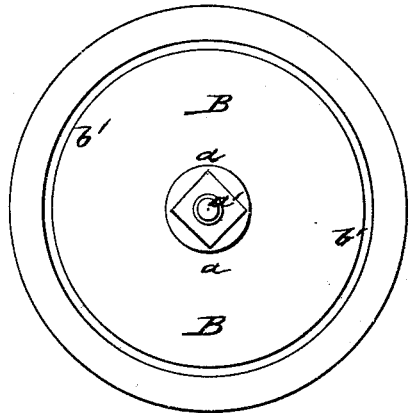 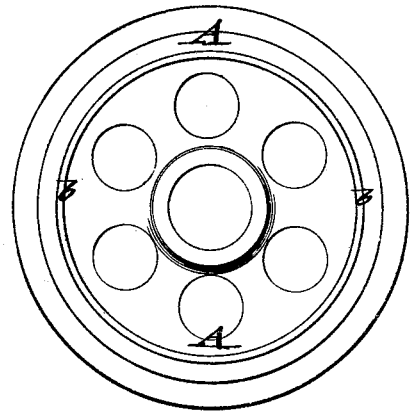
Witnesses: Inventor:

UNITED STATES PATENT OFFICE.

RODOLFO JACOBI, OF PUEBLA, MEXICO.

IMPROVEMENT IN LOOSE-RIM WHEELS.

Specification forming part of Letters Patent No. 185,929, dated January 2, 1877; application filed October 26, 1876.

*To all whom it may concern:*

Be it known that I, RODOLFO JACOBI, of Puebla, in the Republic of Mexico, have invented a new and Improved Wheel, of which the following is a specification:

In the accompanying drawing, Figure 1 represents an axle with my improved wheels, of which one is shown in vertical central section, the other in end view; and Figs. 2 and 3 are side views, respectively, of the fixed web-section, and of the movable tire-section.

Similar letters of reference indicate corresponding parts.

The invention relates to an improved construction of safety friction-wheels for railroad-cars, vehicles, engines, and other machinery, by which the motion of the axle or shaft may be quickly interrupted without interrupting the motion of the wheel, or transmission of power; and the invention consists of a central tire-section that turns between fixed and detachable web sections, being guided by annular side flanges in corresponding grooves of the web-sections which are secured to the axle.

In the drawing, A represents the tire-section of my improved wheel, which is placed on a sleeve, $a$, of the web-section B, that is rigidly secured to the axle or shaft C. The tire-section A is placed intermediately between the fixed web-section and a detachable web-section, D, being guided by side flanges $b$ in corresponding grooves $b'$ of the web-sections. The detachable section is seated on the square extension $a'$ of sleeve $a$ of the fixed web-section, and secured thereon by a spring-plate, $d$, and screw-nut $e$, turning on the threaded part of the axle, or by other suitable means, by which the desired friction between the tire and web sections is obtained. When this construction is used for car-wheels, the outer web-section is equal in diameter with the tire, while the fixed web is equal in diameter to the tire and rail bearing-flange, so as to strengthen the latter. The tire-section is retained firmly between the web-section, and supported by the same, even in case it is damaged or broken, the car being enabled to run without breaking down, as the weight is taken up and borne by the web-sections. By connecting the fixed web-shaft with suitable brake mechanism, the motion of the car may be retarded, and finally stopped by the friction between the web and tire sections, so that the axle may arrive at a point of rest while the tire-section may continue to slide between the web-sections, and take up thereby the friction with the rail. It serves, in this manner, as a safety-wheel for preventing accidents by the breaking of the tire, and also as a friction or brake device.

In similar manner fly-wheels of engines, lathes, &c., may be constructed to avoid accidents, and thereby the engine quickly stopped while the tire and belt continue to revolve by their friction. When applied to common vehicle-hubs, the friction between the hub and the web-plates of the axle forms, also, a brake device of superior merits, which may be thrown readily into operation by lever connection with the driver's seat.

Having thus described my invention, I claim as new and desire to secure by Letters Patent—

The outer web-sections fixed to the axle, and the intermediate movable tire-section, guided and turning between the web-sections, which are extended to the circumference of the tire-section, in combination with a friction-regulating spring-disk and set-screw of axle, substantially as specified.

RODOLFO JACOBI.

Witnesses:
 KUNO DIMMERS,
 INAS. NIDA.